United States Patent
Brunnett et al.

(10) Patent No.: US 6,882,489 B1
(45) Date of Patent: Apr. 19, 2005

(54) DYNAMIC OFF-TRACK DETECTOR

(75) Inventors: Don Brunnett, Pleasanton, CA (US); John Purkett, Longmont, CO (US); Bruce Liikanen, Berthoud, CO (US)

(73) Assignee: Maxtor Corporation, Longmont, CO (US)

( * ) Notice: Subject to any disclaimer, the term of this patent is extended or adjusted under 35 U.S.C. 154(b) by 376 days.

(21) Appl. No.: 09/639,567

(22) Filed: Aug. 15, 2000

(51) Int. Cl.[7] ........................ G11B 15/04; G11B 15/087
(52) U.S. Cl. ........................ 360/60; 360/75; 360/77.08
(58) Field of Search .............................. 360/31, 53, 25, 360/60, 78.02, 75, 77.08, 77.02, 68; G11B 15/04, 15/087

(56) References Cited

U.S. PATENT DOCUMENTS

| | | | |
|---|---|---|---|
| 5,004,207 A | 4/1991 | Ishikawa et al. | 248/632 |
| 5,126,895 A | 6/1992 | Yasuda et al. | 360/77.07 |
| 5,153,789 A | 10/1992 | Bernett et al. | 360/78.04 |
| 5,227,929 A | 7/1993 | Comerford | 360/75 |
| 5,235,472 A | 8/1993 | Smith | 360/60 |
| 5,333,138 A | 7/1994 | Richards et al. | 371/7 |
| 5,389,850 A | 2/1995 | Wilmer | 310/329 |
| 5,392,290 A | 2/1995 | Brown et al. | 371/10.1 |
| 5,426,545 A | 6/1995 | Sidman et al. | 360/78.09 |
| 5,491,394 A | 2/1996 | Harwood et al. | 318/563 |
| 5,491,676 A | 2/1996 | Yamaguchi et al. | 369/44.28 |
| 5,576,909 A | 11/1996 | Dierkes et al. | 360/78.09 |
| 5,696,645 A | 12/1997 | Laughlin | 360/75 |
| 5,710,943 A | 1/1998 | Burton et al. | 395/872 |
| 5,777,815 A | 7/1998 | Kasiraj et al. | 360/75 |
| 5,923,487 A | 7/1999 | Carlson et al. | 360/60 |
| 6,115,200 A * | 9/2000 | Allen et al. | 360/60 |
| 6,313,964 B1 * | 11/2001 | Lamberts et al. | 360/75 |
| 6,429,990 B1 * | 8/2002 | Serrano et al. | 360/60 |
| 6,754,021 B1 * | 6/2004 | Kisaka et al. | 360/60 |
| 2002/0030915 A1 * | 3/2002 | Nishida et al. | 360/60 |

FOREIGN PATENT DOCUMENTS

WO     WO 94/11874     5/1994     ........... G11B/19/04

* cited by examiner

*Primary Examiner*—Sinh Tran
*Assistant Examiner*—Dan I Davidson
(74) *Attorney, Agent, or Firm*—Tejpal S. Hansra

(57) ABSTRACT

A method and apparatus for dynamically detecting write fault errors is provided. According to the invention, transducer head control parameters are adjusted according to observed events. For instance, off-track events of a certain magnitude may trigger the implementation of a severe shock timer, which lengthens the delay between the off-track event and allowing write operations to resume, as compared to the standard off-track timer. According to another embodiment of the present invention, a lower write fault threshold is implemented following an off-track event of sufficient magnitude. According to yet another embodiment of the present invention, the average or accumulated position error of the transducer head is monitored, and a lower write fault threshold implemented if the average position error exceeds a threshold value. The present invention's provision of a method and apparatus that enables transducer head control parameters to be modified in response to observed off-track events allows the disk drive to provide high resistance to data loss without significant detrimental effects on the data throughput performance of the disk drive.

43 Claims, 8 Drawing Sheets

DYNAMIC OFF-TRACK DETECTOR

FIELD OF THE INVENTION

The present invention relates to the positioning and control of computer disk drive transducer heads. In particular, the present invention relates to protecting against track misregistration errors that may occur when a transducer head is off track.

BACKGROUND OF THE INVENTION

Computer disk drives store information on magnetic disks. Typically, the information is stored on each disk in concentric tracks. The data tracks are usually divided into sectors. Information is written to and read from a disk by a transducer head. The transducer head may include a read head separate from a write head, or the read and write head may be integrated into a single read/write head. The transducer head is mounted on an actuator arm capable of moving the transducer head radially over the disk. Accordingly, the movement of the actuator arm allows the transducer head to access different data tracks. The disk is rotated by a spindle motor at a high speed, allowing the transducer head to access different sectors within each track on the disk.

The actuator arm is interconnected to a motor, such as a voice coil motor (VCM), to move the actuator arm such that the transducer head moves radially over the disk. Operation of the VCM is controlled by a servo control system. The servo control system generally performs two distinct functions: seek control and track following. The seek control function comprises controllably moving the actuator arm such that the transducer head is moved from an initial position to a target track position. In general, the seek function is initiated when a host computer associated with the computer disk drive issues a command to read data from or write data to a target track on the disk. Because of the increasingly high demands on the performance of computer storage devices such as disk drives, it is desirable that the transducer head be moved from its initial position to a target track as quickly as possible. Once the transducer head has been moved sufficiently close to the target track by the seek function of the control system, the track following function of the servo control system is activated to center and maintain the transducer head on the target track until the desired data transfers are completed.

Typically, the transducer head will oscillate about the center line of the target track for a period of time following the transition of the servo control system from the seek mode to the track following mode. Because data written while the transducer head is oscillating about the centerline of a track may be unrecoverable during subsequent attempts to read that data, write operations are typically prohibited for a period of time following a transition from the seek mode to the track following mode. In addition, because data from adjacent tracks may inadvertently be read, or may corrupt the read signal collected by the transducer head during read operations attempted while the transducer head is oscillating, read operations are also typically inhibited for a period of time following a transition from the seek mode to the track following mode. By providing such "settling times" during which reading and writing by the transducer head is not allowed, the integrity of data written to or read from a disk drive may be better ensured.

Computer disk drives are also susceptible to data errors due to external shocks. This is because shocks can cause the transducer head to deviate from a desired position over the centerline of a data track. Therefore, it is important to prohibit the transfer of data to and from the disk during shock events. In particular, it is important to prohibit the writing of data to a disk when shock events occur, to prevent unrecoverable errors, such as may occur when data is written to unintended areas of the disk.

As will be understood by those of skill in the art, the "centerline" of a data track does not necessarily coincide with the physical centerline of the data track. Instead, "centerline" may refer to the center of the intended data storage area of the data track. Therefore, as used herein, "centerline" of a data track need not refer to the physical centerline of the data track, and "centered" indicates that the transducer head is properly centered over the area within the track that is intended for data storage, regardless of whether that position coincides with the physical centerline of the data track.

A track misregistration error occurs when the transducer head of a disk drive is not properly centered over a data track. In particular, a read track misregistration error occurs when the read head of a transducer head is not properly centered over a data track centerline. Likewise, a write track misregistration error occurs when a write head of a transducer head is not properly centered over a data track centerline. Write track misregistration errors are particularly troublesome, because they can result in permanent data loss. For instance, data written to the disk while the write head is not centered over the data track may be unrecoverable during read operations performed later to retrieve the previously written data. This is because the read head, traveling over the centerline of the data track (i.e., looking for the data in the expected position), may not be able to retrieve the data that was written off-center. In addition to the loss of the data being written, data previously written to adjacent tracks may also be lost. For example, data written while a write head is off center may completely overwrite data in an adjacent track, or may adversely affect the magnetic transitions storing the data in the adjacent track such that the previously written data is unrecoverable. For all of these reasons, it is important to detect track misregistration errors, and to prohibit writing by the transducer head while the transducer head is not properly centered over the target track.

Generally, a write fault occurs when a transducer head of a computer disk drive has deviated a predetermined distance from the centerline of the target track and the servo control system is in track following mode. Write faults are commonly caused by external shocks to the hard disk drive. In response to a write fault, a disk drive may trigger write fault condition which is maintained for a predetermined period of time, to allow oscillations caused by the shock event to dampen and disappear. While the write fault conditions is in effect, write operations are disabled.

In setting the distance that a transducer head must deviate from the track centerline (i.e., the magnitude of the tracking error) before a write fault is triggered, and in setting the amount of time during which the write function will be prohibited, consideration must be given to the data transfer performance of the disk drive. This is because delays in writing, although effective at avoiding track misregistration errors, reduce the data transfer performance of the disk drive. However, although the data transfer performance is of great concern to the designer of a computer disk drive, ensuring the integrity of data stored on the disk drive is of paramount importance.

Previous methods of detecting shock events and triggering write fault events have used accelerometers and other devices not required to perform the basic functions of a disk drive. Accordingly, such methods of detecting shock events add to the cost of the hard drive. In addition, previous shock detection methods treated all shock events equally, regardless of the severity of the shock event, and therefore unnecessarily compromised the data throughput performance and resistance to data loss of the hard drive.

It would be advantageous to provide a computer disk drive that is capable of preventing data misregistration errors due to shock events. In particular, it would be advantageous to provide a computer disk drive having a seek control system capable of reacting to shock events in different ways, depending on the severity of a particular event. In addition, it would be advantageous to provide a computer disk drive capable of registering the severity of shock events without the need for a separately provided shock detector. Furthermore, it would be advantageous to provide a computer disk drive capable of protecting against track misregistration errors without unduly limiting the data transfer performance of the disk drive.

SUMMARY OF THE INVENTION

In accordance with the present invention, a method and apparatus for dynamically altering the transducer head position control parameters of a computer disk drive are provided. The present invention generally allows transducer head control parameters to be adjusted in response to observed events. In particular, the present invention allows control parameters of a disk drive to be modified in response to observed off-track events without requiring hardware extraneous to the operation of the disk drive itself, and in response to persistent transducer head position errors.

In accordance with one embodiment of the present invention, a method and apparatus is provided in which the position error of a transducer head with respect to a target track is monitored. Where a large deviation from the centerline of the desired track is observed, a severe shock may be implied, and transducer head control parameters may be modified. In particular, in response to such a severe off-track event, a severe shock timer may begin to run. This severe shock timer, while it is running, prohibits write operations from occurring. The severe shock timer is in addition to a normal or mild off-track timer, which may be triggered by off-track events of lesser magnitude. The severe shock timer also differs from the mild off-track timer in that it has a much longer running time. This long running time allows oscillations or ringing in the disk drive assembly to dampen and disappear before write operations are again attempted. In addition, because the ringing following a severe shock event has a relatively low frequency, the long delay introduced by the severe shock timer prevents the disk drive controller from repeatedly cycling between an off-track state in which writing is prohibited due to the operation of the normal off-track timer, and an the "on track" state, which may be entered as the transducer head passes through the centerline of the target track.

According to another embodiment of the present invention, the transducer head control parameters are modified in response to a severe shock event such that any subsequent off-track events more easily trigger a write fault condition. In particular, in response to an off-track event of sufficient magnitude, a lower write fault threshold may substitute for the normal write fault threshold for at least a predetermined period of time. Because off-track events due to shocks commonly occur in closely spaced groups, this embodiment of the present invention allows the system to quickly respond to subsequent off-track events, and to better protect the drive against track misregistration errors.

According to yet another embodiment of the present invention, a method and apparatus for modifying transducer head control parameters in response to a persistent transducer head position error is provided. According to this embodiment of the present invention, an accumulated average transducer head position error is compared to a threshold average position error. If the threshold average position error is exceeded, a lower write fault threshold or other modification to the transducer head control parameters may be activated for a period of time. Thus, where, for example, the transducer head is continuously traveling to one side of the centerline of the target track, the position error of the transducer head required to trigger a write fault is reduced. This is advantageous because, as the transducer head is traveling to one side of the data track, it is more vulnerable to being knocked out of position by a shock, potentially corrupting data in adjacent tracks, or otherwise experiencing a track misregistration error.

Based on the foregoing summary, a number of salient features of the present invention are readily discerned. A method and apparatus for modifying the transducer head control parameters of a disk drive are provided. The method and apparatus of the present invention enable transducer head control parameters to be adjusted in response to observed environmental conditions. Accordingly, a disk drive in accordance with the present invention is capable of providing the level of protection against data errors that is appropriate to the operating parameters of the disk drive at a given point in time, while maintaining high data throughput performance. In particular, where observed conditions indicate that a track misregistration error that may result in a write fault is imminent, protection against such write faults may be increased. However, where observed conditions do not indicate that a track misregistration error is imminent, more relaxed protection measures may be employed, allowing the drive to operate at a higher rate of performance.

Additional advantages of the present invention will become readily apparent from the following discussion, particularly when taken together with the accompanying drawings.

DETAILED DESCRIPTION

Figure 1:
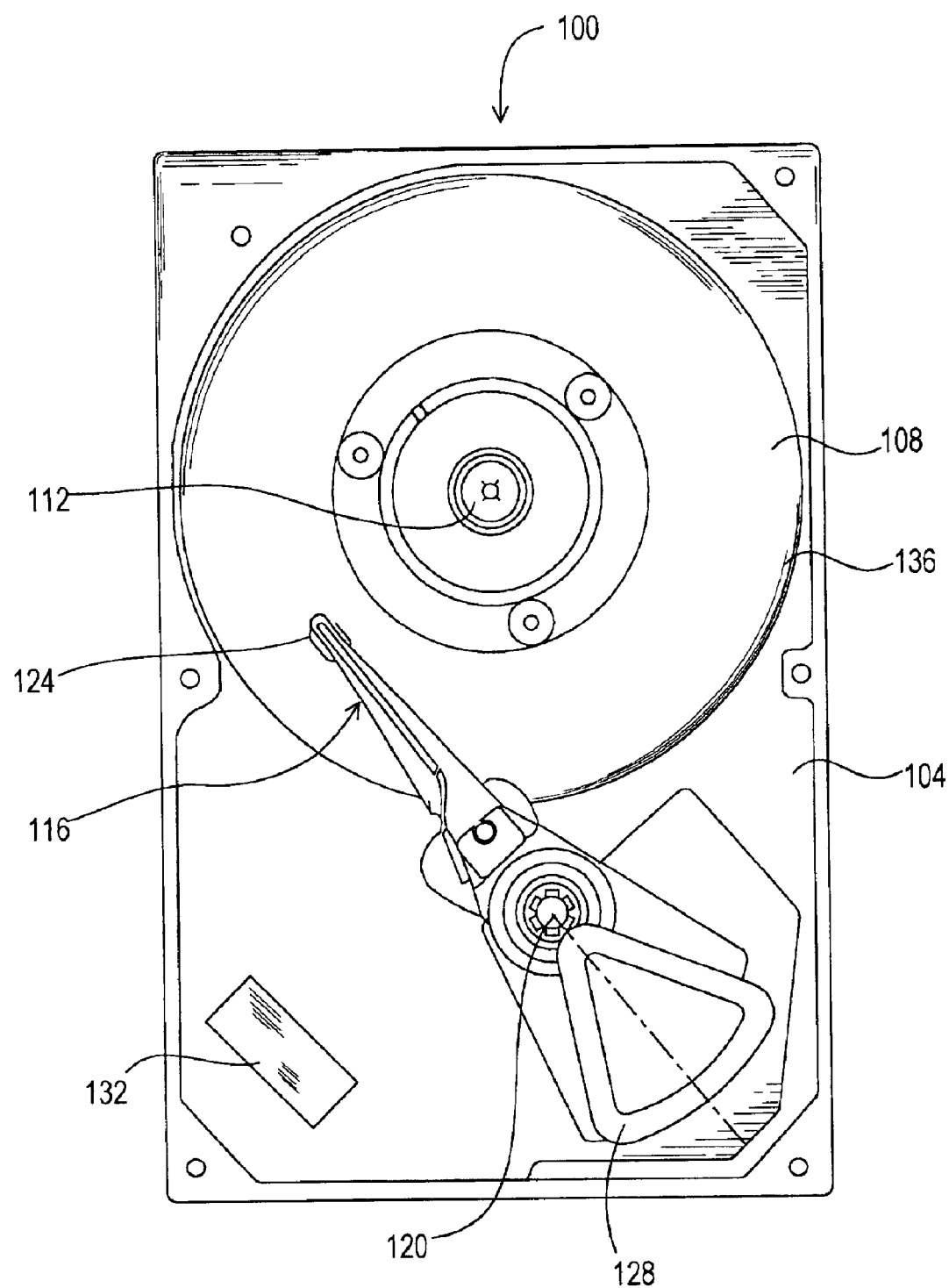
FIG. 1 is a top view of a conventional computer disk drive, with the cover removed.

FIG. 1 illustrates a typical computer disk drive. The disk drive, generally identified by reference number 100, includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104. Actuator arm assemblies 116 (only one of which is shown in FIG. 1) are interconnected to the base 104 by a bearing 120. The actuator arm assemblies 116 include transducer heads 124 (only one of which is illustrated in FIG. 1) at a first end, to address each of the surfaces of the magnetic disks 108. A voice coil motor 128 pivots the actuator arm assemblies 116 about the bearing 120 to radially position the transducer heads 124 with respect to the magnetic disks 108. The voice coil motor 128 is operated by a controller 132 that is in turn operatively connected to a host computer (not shown). By changing the radial position of the transducer heads 124 with respect to the magnetic disks 108, the transducer heads 124 can access different data tracks or cylinders 136 on the magnetic disks 108.

Figure 2:
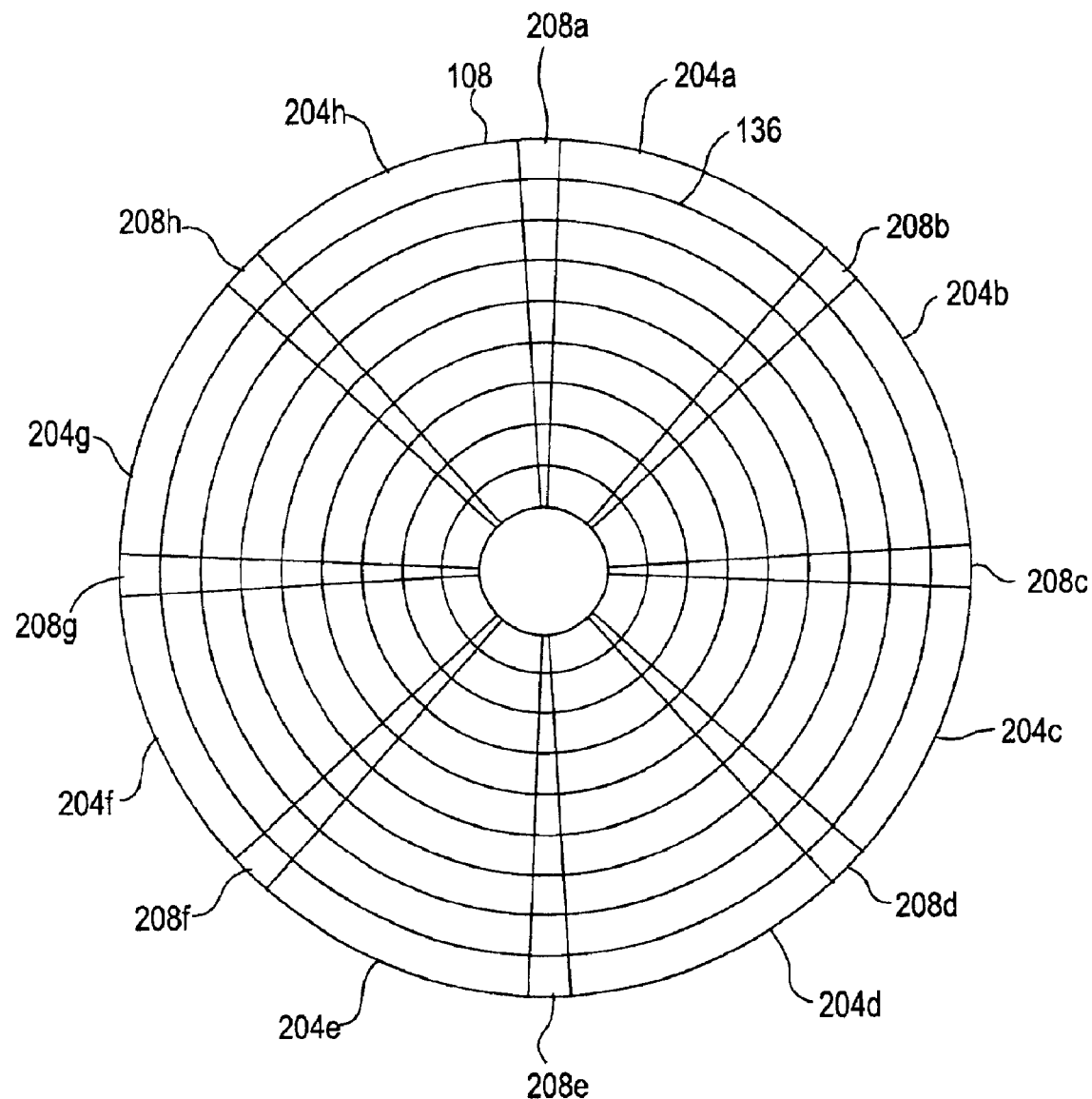
FIG. 2 is a schematic representation of a magnetic storage disk.

With reference now to FIG. 2, a typical arrangement of data tracks 136 on a magnetic disk 108 is illustrated. Usually, the data tracks 136 are divided into data fields 204a–204h with a servo sector 208a–208h between each data field 204a–204h. Generally, the data fields 204a–204h are used for storing data as a series of magnetic transitions, while the servo sectors 208a–208h are used for storing information used to provide the transducer head 124 with positioning information. In particular, the servo sectors 208a–208h provide the transducer head 124 with information concerning its position over the magnetic disk 108. More particularly, the servo sectors 208a–208h provide information to the transducer head 124 concerning the position of the transducer head 124 with respect to the centerline of a target track 136.

Although the magnetic disks 108 illustrated in FIGS. 1 and 2 are illustrated as having a relatively small number of data tracks and sectors, it can be appreciated that a typical computer disk drive contains a very large number of data tracks and sectors. For example, computer disk drives having over 14,000 tracks per inch and 240 sectors are presently available. In addition, alternate configurations of magnetic disks 108 are possible. For example, in a computer disk drive having several magnetic disks 108, a surface of one of the disks 108 may be dedicated to servo information, while the surfaces of the remaining disks 108 are used exclusively to store data.

Figure 3:
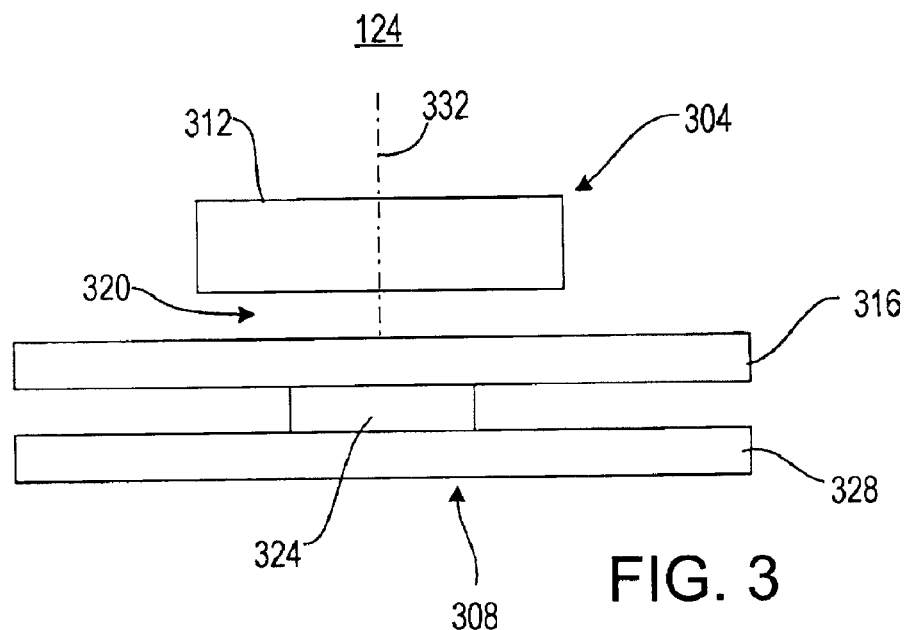
FIG. 3 is a plan view of a disk drive transducer head incorporating an inductive write head and a magnetoresistive read head, wherein the illustrated surface of the transducer head faces the magnetic disk.

A typical transducer head contains functionally separate write and read heads, or elements. A transducer head 124 having a write head 304 and a separate magnetoresistive read head 308 is illustrated in plan view in FIG. 3.

The write head 304 may include a write pole 312 and a shared shield 316. The write pole 312 and shared shield 316 are joined magnetically to form a yoke, about which a coil of wire is wrapped (not shown). In operation, current may be passed through the coil in a first direction to produce a magnetic field within the yoke. At a gap 320 formed between the end of the write pole 312 and the end of the shared shield 316, the magnetic field spreads out because the magnetic permeability of the gap is less than that of the yoke itself. The gap 320 is positioned so that it is in close proximity to a magnetic disk 108, allowing some of the magnetic field to magnetize a portion of the disk 108 in a particular direction. In a typical disk drive for use in a digital computer, a "1" is coded by reversing the direction in which the disk is magnetized from one portion of the track to the next. This is done by reversing the direction of the current in the coil. A "0" is indicated by the absence of a change in magnetic polarity. Of course, these conventions could be reversed. The information, in the form of magnetic flux transitions, is encoded in narrowly defined tracks 136 on the magnetic disk 108.

The read head 308 in a disk drive operates by sensing the magnetic flux transitions encoded in the disk 108 by the write operation. One method of sensing such transitions is with a magnetoresistive head. Such a head is comprised of material that changes its electrical resistance when it is exposed to a magnetic field. In a magnetoresistive read head, a strip of magnetoresistive material 324 is held between the shared shield 316 and a read shield 328. Each end of the strip of the magnetoresistive material 324 is connected to a conductor (not shown). The conductors are in turn connected to a current source (not shown). Because the electrical resistance of the magnetoresistive material 324 varies with the strength and direction of an applied magnetic field, transitions in the magnetic flux passing through the magnetoresistive material 324 result in changes in the voltage drop across the magnetoresistive strip 324. These changes in the voltage drop are sensed and then converted into a digital signal for use by the host computer. Of course, other methods for sensing the magnetic flux transitions may be used in connection with a disk drive in accordance with the present invention. For example, the transducer head may use inductive, giant magnetoresistive, spin valve, dual spin valve, or any other type of read head for sensing magnetic transitions.

In order to sense the transitions between the small magnetic fields written to the disk 108 and thus retrieve data from the magnetic disk 108, the read head 308 is held in close proximity to the track containing the desired information. The disk 108 is rotated under the head 124, and flux transitions read by the read head 308 are interpreted as a binary "1", as described above. The magnetic shields on either side of the magnetoresistive material 324 limit the effect of magnetic flux transitions adjacent to or in the proximity of the precise area of the track from which information is to be retrieved.

In performing write operations, it is important that the centerline 332 of the write head 304 is centered over the intended data track 136. If the write head 304 is not so positioned, there is a risk that information written while the write head 304 was not properly centered over the intended data track 136 will not be retrievable during future read operations. This is because the data will not be in the expected position. In addition, it is possible that data in an adjacent track will be overwritten or corrupted if a write operation is performed while the write head 304 is not held within a narrow region about the centerline of the intended data track 136. Therefore, when the transducer head 124 is not adequately centered over the desired data track 136, the transducer head 124 is considered to be in an "off-track" state, during which write operations are not permitted. In addition to periods of time during which the transducer head 124 is being moved from one data track 136 to another, the transducer head 124 may also enter an off-track state due to external shocks experienced by the disk drive 100. Write operations are generally prohibited for a period of time following an off-track event to avoid data errors due to write operations while the transducer head 126 is off-track. However, it is desirable to allow write operations to occur as soon as possible following an off-track event, to ensure the highest possible data throughput performance of the disk drive 100. Therefore, provisions taken to ensure the absolute integrity of data stored on a disk drive 100 should not unduly limit the performance of the disk drive 100.

Figure 4:
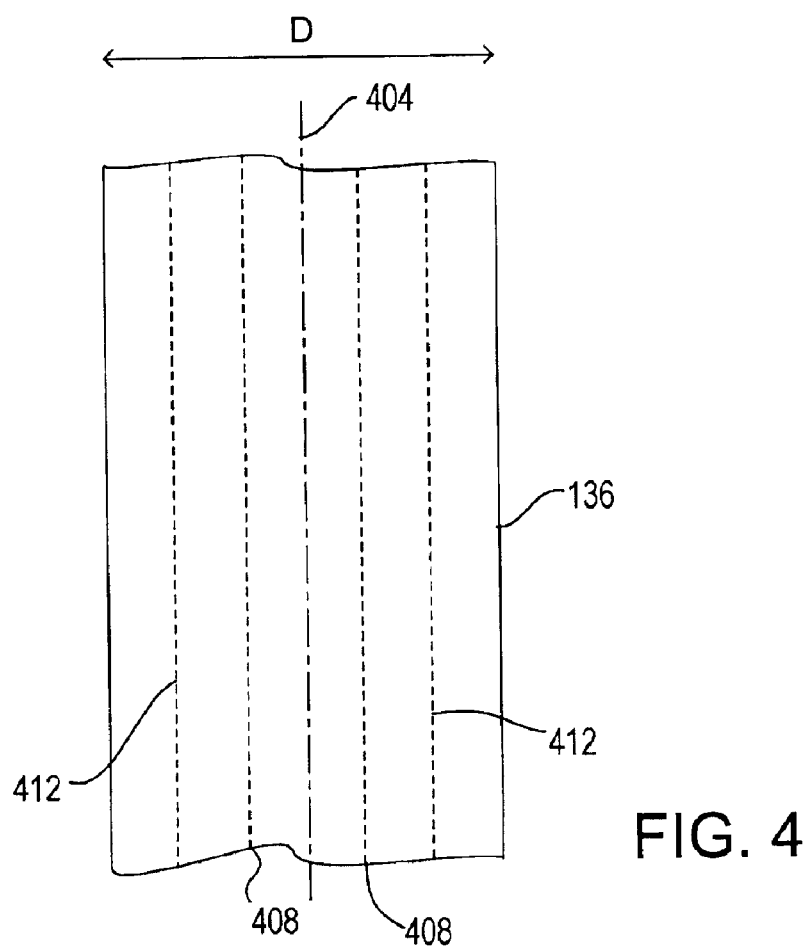
FIG. 4 is a partial schematic illustration of a magnetic storage disk data track.

With reference now to FIG. 4, a portion of a data track 136 is illustrated in plan view. The width D of a typical data track 136 may be about 1 $\mu$m. The centerline 404 of the data track 136 is also the preferred centerline of data written to the data track 136. Typically, data is written to a track using a write head 304 (see FIG. 3) that is about ⅔ the full width of the data track 136. By centering data written to the data track 136 about the centerline 404, the maximum distance between data written to adjacent tracks 136 is maintained. This reduces the possibility of overwriting data in adjacent tracks or corrupting such data. In addition, the centerline is where the disk drive 100 expects data to be positioned in subsequent read operations. When a transducer head 126 is not precisely following the centerline 404 of a data track 136, the magnitude of the deviation may be expressed as a percent of the total track width D by which the transducer head 126 is out of position. For instance, lines 408 represent a distance equal to 15 percent of the total track width D of the data track 136. Also shown in FIG. 4 are lines 412, which are at a distance from the centerline 404 equivalent to 35 percent of the track width D.

Figure 5:
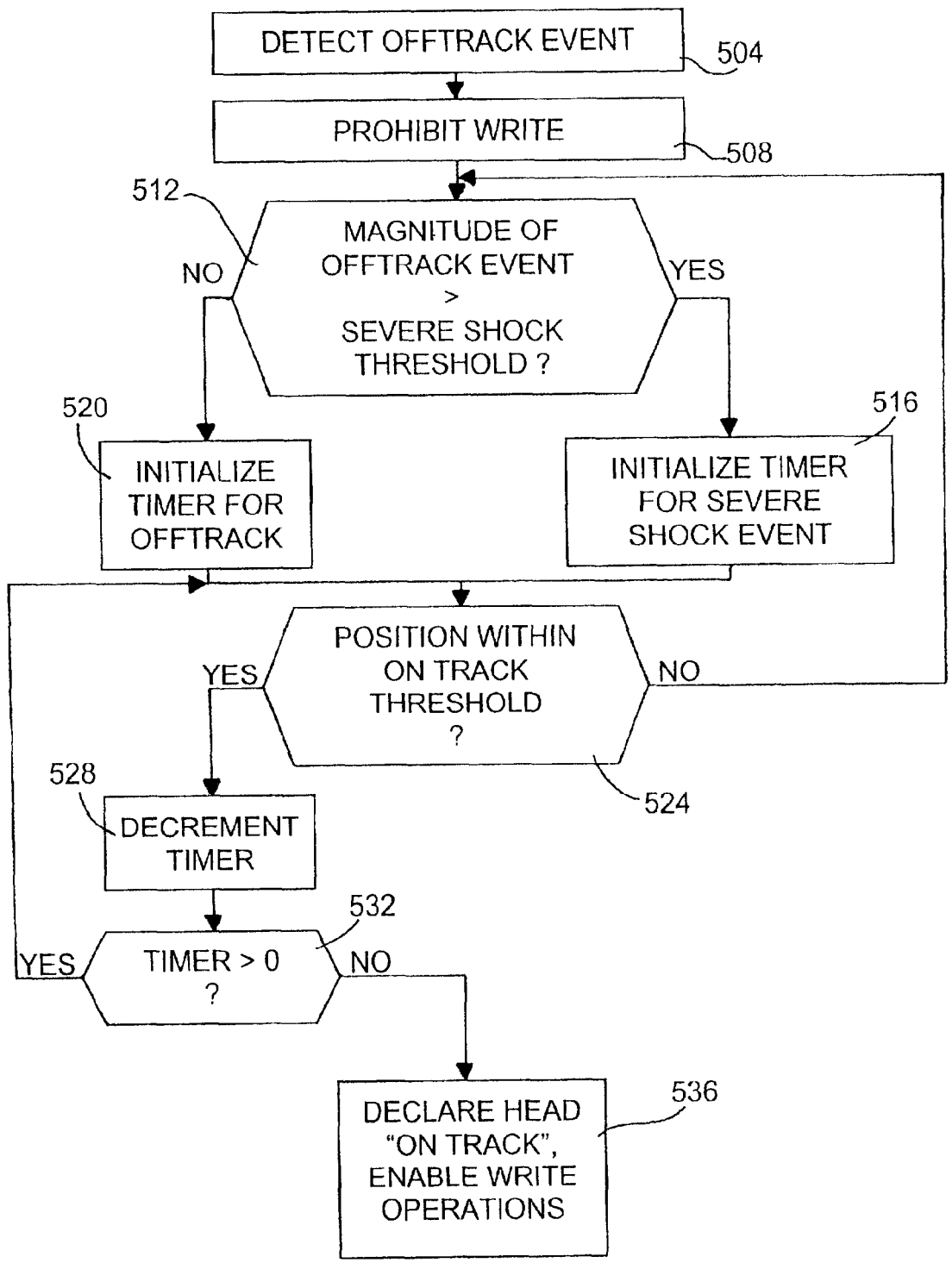
FIG. 5 is a functional flow diagram of the operation of a system according to an embodiment of the present invention.

With reference now to FIG. 5, a flow chart illustrating a method for detecting track misregistration errors is illustrated. Initially, an off-track event is detected (step 504). According to one embodiment of the present invention, the off-track event is recognized as a deviation of the centerline 332 of the write head 304 transducer head 124 from the centerline 404 of a data track 136 by a distance expressed as a percent of the total track width D of the data track 136. For example, an off-track event may be quantified as a deviation of the centerline 332 of the write head 304 from the centerline 404 of the data track 136 by a distance equal to 15 percent of the total width D of the data track 136. Immediately following detection of an off-track event, write operations are prohibited (step 508).

At step 512, the magnitude of the off-track event is considered. If the magnitude of the off-track event is greater than a predetermined severe write fault or shock threshold, the system initializes an off-track timer with a severe shock time value (step 516). While the off-track timer is running, write operations by the transducer head 126 are disabled. Where an off-track event is detected, but the magnitude of the deviation of the transducer head 126 from the centerline 404 (i.e., the write fault) is less than the severe shock threshold (for example, less than 35 percent of the track width D) (step 512), the off-track timer is initialized with an off-track time value (step 520). The off-track time value prohibits write operations for a shorter period of time than the severe shock time value.

After the off-track timer has been initialized, the system determines whether the position of the transducer head is within an on-track threshold (step 524). For example, the system determines whether the transducer head centerline 332 deviates from the centerline 404 of the data track 136 by a distance that is less than 15 percent of the total width of the data track 136. If the transducer head is not within the on-track threshold, the system returns to step 512 to determine the magnitude of the deviation. The system then proceeds to either step 516 or 520, as appropriate. It should be noted that the value held by the timer can only be increased in steps 516 and 520. For example, if a value of 5 ms is held by the timer when step 520 is entered, and the initial off-track value is 130 $\mu$s, the timer would not be reset to a value of 130 $\mu$s. Instead, step 520 would leave the value of 5 miliseconds unchanged. However, if the initial value at steps 516 or 520 is greater than the value held by the timer when step 516 or 520 is entered, the timer is reset to the initial value. For example, if the timer holds a value of 50 $\mu$s when step 520 is entered, and the shock timer initial value is 130 $\mu$s, then the timer is reset to 130 $\mu$s. If the transducer head is within the on-track threshold, the off-track timer is decremented (step 528). According to one embodiment of the present invention, the off-track timer is decremented as each servo sector 208 passes beneath the transducer head 126. According to another embodiment of the present invention, the off-track timer may disable write operations for not less than an initialized period of time.

As mentioned above, the severe shock time value prohibits write operations for a longer time period than does the off-track time value. According to one embodiment of the present invention the severe shock time value disables write operations until the disk 108 has made at least ¼ of a revolution but less than a full revolution. According to a further embodiment of the present invention, the severe shock time value disables write operations until the disk 108 has made at least ½ a revolution but not more than ¾ of a revolution from the point at which the off-track timer was set. According to still another embodiment of the present invention, the severe shock time value prohibits write operations for a time equivalent to the time necessary for the disk 108 to make about ¾ of a revolution. According to a further embodiment of the present invention, the severe shock time value is set so that the off-track timer expires after the passage of 120 servo sectors 208. The severe shock time value may, according to one embodiment, prohibit write operations for approximately six milliseconds. Of course, the period of time, number of servo sectors passed, or the number of revolutions of the disk during which write operations are prohibited may be greater than that determined by the severe shock time value alone if the transducer head does not return to an on-track state by the time of the next position sample.

The off-track time value is generally shorter than the severe shock time value. For example, according to one embodiment of the present invention, the off-track time value prohibits or disables write operations for the time required for two sectors 208 to pass beneath the transducer head 126. This is equivalent to a delay of approximately 130 microseconds when implemented in a typical disk drive 100. As with the severe shock timer, the period of time or number of servo sectors passed during which write operations are prohibited may be greater than that determined by the off-track time value alone if the transducer head does not return to an on-track state by the time of the next position sample.

At step 532, the system determines whether the value held by the off-track timer is greater than zero. If it is, write operations continue to be prohibited, and the system returns to step 524 to determine whether the transducer head centerline 332 is within the on-track threshold. If the value held by the off-track timer is not greater than zero, the transducer head 124 is declared to be "on-track," and write operations are enabled (step 536).

The method illustrated in FIG. 5 ensures that data is written to the magnetic disk 108 in such a way that it can be reliably retrieved at a later time, without greatly affecting the performance of the disk drive 100. In particular, following off-track events of relatively small magnitude, write operations are disabled for a relatively short period of time. Therefore, the transducer head 126 may continue write operations soon after the off-track event that caused the transducer head 126 to deviate from the centerline 404 of the data track 136 by the prescribed amount. In this way, write operations are inhibited only as long as necessary.

Following a more severe off-track event, such as one caused by a shock, the inventors have discovered that a relatively low frequency oscillation, or spindle rocking mode, can occur in the hub 112 of the disk drive 100. This oscillation, or ringing, causes the magnetic disk 108 to move radially with respect to the transducer head 126. Particularly in connection with the small track widths used in high density hard disk drives, this movement may result in data misregistrations. However, because it is of relatively low frequency, the data track 136 may appear to be properly centered under the transducer head 126 for a long enough time period that a conventional servo controller 132 will declare the transducer head 126 to be "on-track." Accordingly, in such systems it is possible for a track misregistration error to occur after the off-track timer has expired. Therefore, data may be written in such a way that it is unrecoverable, and/or corrupts or overwrites data in adjacent tracks 136.

In order to prevent such track misregistration errors, the present invention provides for an extended settle time following a severe off-track or shock event, and a shorter settle time following a mild off-track event. Generally, the length of the delay following a severe off-track event is set so that oscillations in the hub 112 can dampen. The impact of this embodiment of the present invention on the performance of a disk drive 100 is small, as it is operative only after severe off-track events. Accordingly, the present invention allows transducer head control parameters to adapt to observed environmental conditions and provide appropriate measures to ensure the integrity of the data. Although the discussion above has been in terms of one shock-timer that can be initialized to either of an off-track time value or a severe shock time value, it should be understood that the timer may be initialized using additional time values of varying lengths in response to shocks of varying magnitudes. In addition, it should be understood that multiple timers may be used, as in the following example.

Figure 6A:
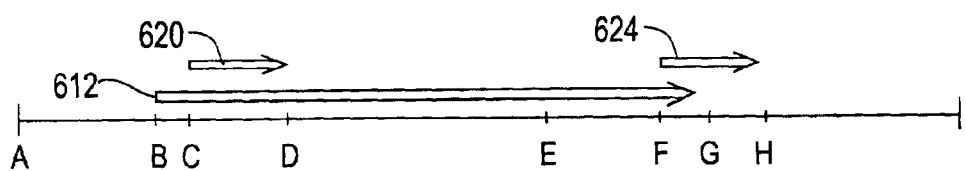
FIG. 6A is a time line of the operation of a system according to an embodiment of the present invention illustrated in FIG. 5.
Figure 6B:
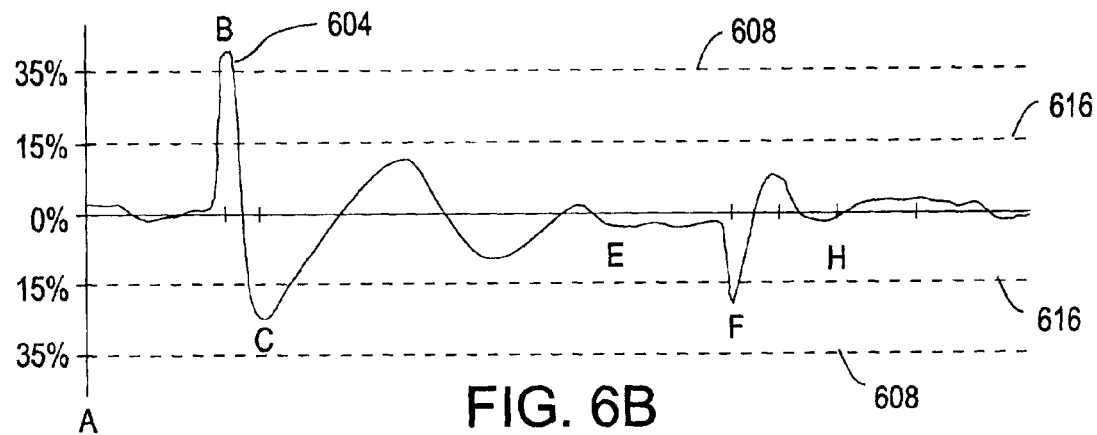
FIG. 6B is a time line showing an example position error of a transducer head relative to a data track centerline.

With reference now to FIGS. 6A and 6B, aspects of the operation of the method illustrated in FIG. 5 are shown. In particular, FIG. 6A illustrates a time line showing when the severe shock timer and the mild shock timer of the above-described embodiment are operative. The trace 604 in FIG. 6B illustrates the position of the centerline 332 of the write head 304 with respect to the centerline 404 of a target data track 136 in terms of the percent of total track width by which the write head 304 is off center, and at times corresponding to the events illustrated in the time line of FIG. 6A. The example of the operation of an embodiment of the present invention illustrated in FIGS. 6A and 6B differs from the embodiment illustrated in FIG. 5 in that a separate off-track timer and severe off-track event or shock timer are used in FIGS. 6A and 6B.

In FIG. 6B, a large deviation from the centerline 404 by the transducer head 126 can be seen to occur at point B. Because of the magnitude of this off-track event, the trace 604 crosses the severe off-track or shock threshold 608, shown in FIG. 6B as being equal to a distance corresponding to 35 percent of the total track with D. Accordingly, the severe shock timer is triggered at time B. The time during which the severe shock timer is operative is illustrated in FIG. 6A by arrow 612.

With reference again to FIG. 6B, a series of relatively large amplitude, low frequency oscillations can be seen to occur following the initial off-track event at point B and continuing to point E. Because the severe shock timer 612 is active between points B and G, no write operations are allowed to occur during that time. Therefore, track misregistration errors due to the "ringing" of the disk drive assembly 100 are avoided. Note that the "ringing" seen between points B and E in FIG. 6B extends for a relatively long period of time.

At point C in FIG. 6B, an oscillation extending beyond the off-track event threshold 616, shown in FIG. 6B as being equal to a distance corresponding to a 15 percent deviation from the track centerline 404, can be seen. Although according to this embodiment the oscillation at point C triggers the off-track timer, the activation of which is shown by the arrow 620 in FIG. 6A, operation of the disk drive is not affected, as the severe shock timer 612 is already in operation. Of course, in an alternative embodiment, the off-track timer need not be triggered when the severe shock timer is in operation.

At point F, a second off-track event can be seen to occur in FIG. 6B. The shock event at time F is smaller in magnitude than that at time B, and the severe shock timer is not activated. However, the shock at time F crosses the off-track event threshold 616, and therefore is severe enough to trigger the off-track timer. This second activation of the off-track timer is illustrated in FIG. 6A as arrow 624. The off-track timer is active from time F until time H, at which time write operations will again be allowed, provided that the transducer head 124 is otherwise found to be adequately centered in the data track 136. Note that severe oscillations in the position of the transducer head 126 relative to the centerline 404 of the data track 136 have in the example in FIG. 6B ceased by time H, which time corresponds to the extinction of the off-track timer 624. Also note that the operation of the severe shock timer 612 expires at time G (FIG. 6A), but that write operations will not be allowed until time H. Therefore, it can be appreciated that, at least with regard to one embodiment of the present invention, the operation of the off-track and severe shock timers may overlap. Accordingly, the present invention may protect against track misregistration errors even when off-track events occur in rapid sequence.

Figure 7:
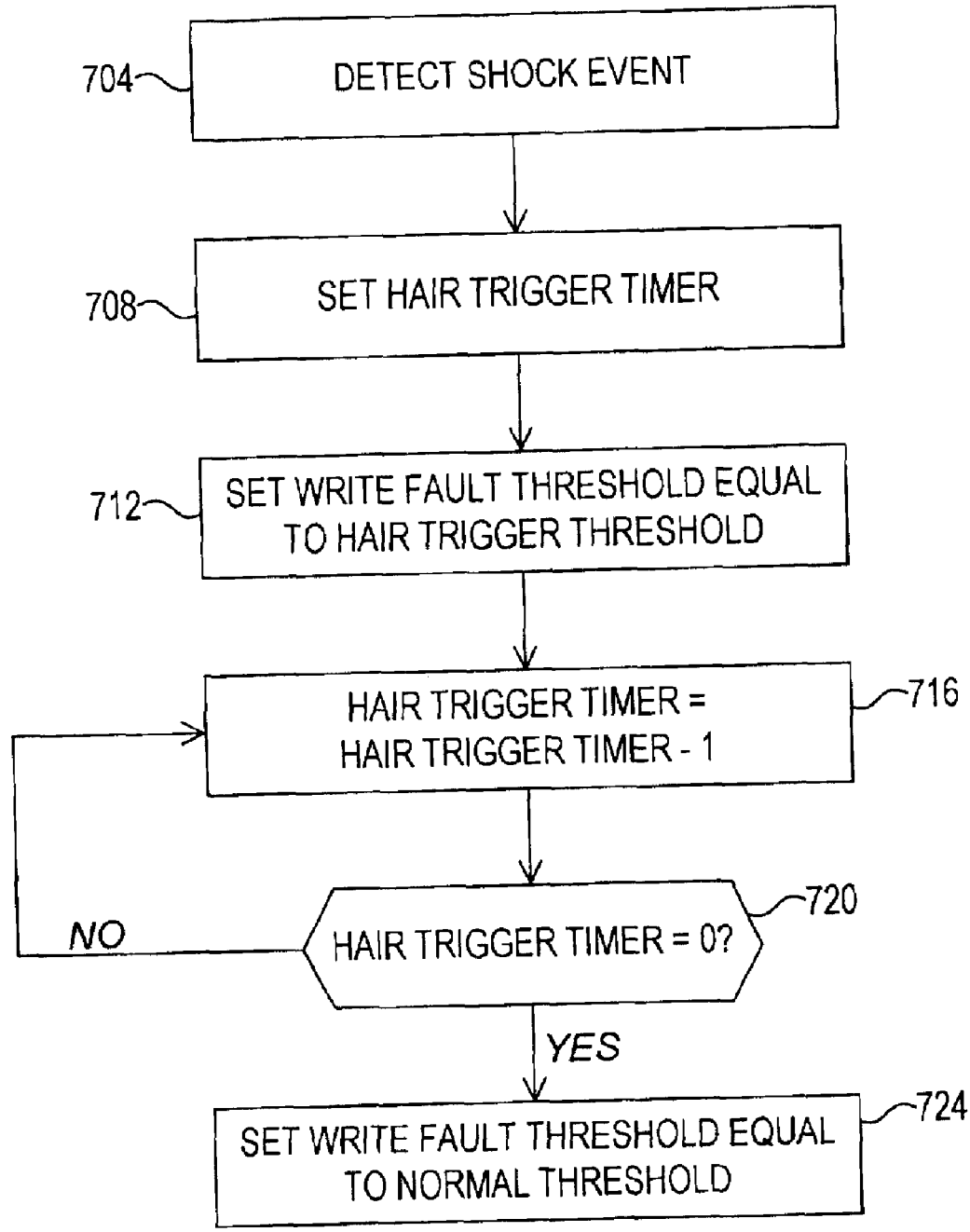
FIG. 7 is a functional flow diagram of the operation of a system according to another embodiment of the present invention.

Referring now to FIG. 7, a flow chart illustrating the operation of another embodiment of the present invention is shown. This embodiment of the present invention is particularly well suited to guarding against track misregistration errors that may occur when the disk drive is subjected to a series of off-track events, such as may be caused by a series of shocks. According to this embodiment of the present invention, an off-track event is detected (step 704) by any one of a variety of means. For example, the off-track event may be detected as a deviation of the write head 304 from the centerline 404 of the target track 136 by at least a prescribed amount. Alternatively, the off-track event may be detected as a prescribed minimum velocity at which the write head 304 exceeds a predetermined distance from the centerline 404 of the target track 136. For example, a write head 304 that exceeds a distance from the centerline 404 of the target track 136 corresponding to 10 percent of the total width of the target track 136 at a certain minimum velocity may trigger detection of an off-track event.

After an off-track event has been detected, a hair trigger timer is set (step 708). Also following detection of the off-track event (step 704), the write fault threshold is changed from its normal value to a hair trigger value (step 712). For example, where the write fault threshold is expressed as a distance from the centerline 404 of the target track 136, and the normal write fault threshold is a distance from the centerline 404 equal to 20 percent of the total width of the target track 136, the hair trigger threshold may be a distance from the centerline 404 equivalent to 10 percent of the total width D of the target track 136. Similarly, where the write fault threshold is expressed as the velocity with which the write head 304 exceeds a predetermined distance from the centerline 404 of the target track 136, the velocity necessary to trigger a write fault when the hair trigger threshold is set may be lower than the velocity necessary to trigger a write fault when the normal threshold is in place. Accordingly, it can be appreciated that, when the hair trigger timer is running, a hair trigger threshold for write fault events replaces the normal write fault threshold. It further can be appreciated that the hair trigger threshold may be exceeded by a smaller off-track event than is required to exceed the normal write fault threshold.

At step 716, the hair trigger timer is decremented. According to one embodiment of the present invention, the hair trigger timer is decremented for each sector 208 that the transducer head 126 passes over. When the hair trigger timer is equal to zero, or has otherwise run its course (step 720) the hair trigger write fault threshold is replaced by the normal write fault threshold (step 724). As with the other embodiments of the present invention, the hair trigger timer, in addition to being implemented as a count value that is decremented with each sector 208 that passes beneath the transducer head 126, may be implemented as a clock timer dependent only on a time count. Furthermore, as with the timers included as part of the other embodiments of the present invention, the hair trigger timer may be implemented as software routines running in the controller 132 of the disk drive 100. Alternatively, the timer may be implemented as separate hardware devices in communication with the controller 132 of the disk drive 100.

The method illustrated in FIG. 7 provides increased protection against track misregistration errors caused by off-track events, such as may be caused by shocks. This is because the lower write fault threshold in place while the hair trigger timer is in operation allows a write fault to be declared more easily. Accordingly, following an off-track event triggering the hair trigger timer, the system implementing the present embodiment of the invention may substitute a more sensitive write fault threshold. In this way, a write fault may be declared in response to smaller off-track events than is normally required. Accordingly, this embodiment of the present invention increases the disk drive's 100 protection against track misregistration errors where the disk drive 100 experiences a series of off-track events in close temporal proximity. In addition, this increased protection against track misregistration errors is provided with little detriment to the data throughput performance of the disk drive 100, as the hair trigger threshold is only in place following a first off-track event of the required magnitude.

Figure 8A:
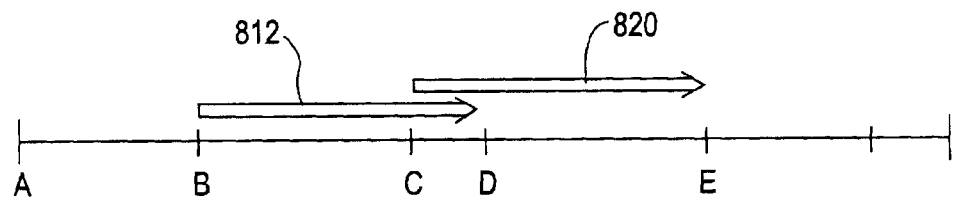
FIG. 8A is a time line showing the operation of a system according to an embodiment of the present invention illustrated in FIG. 7.
Figure 8B:
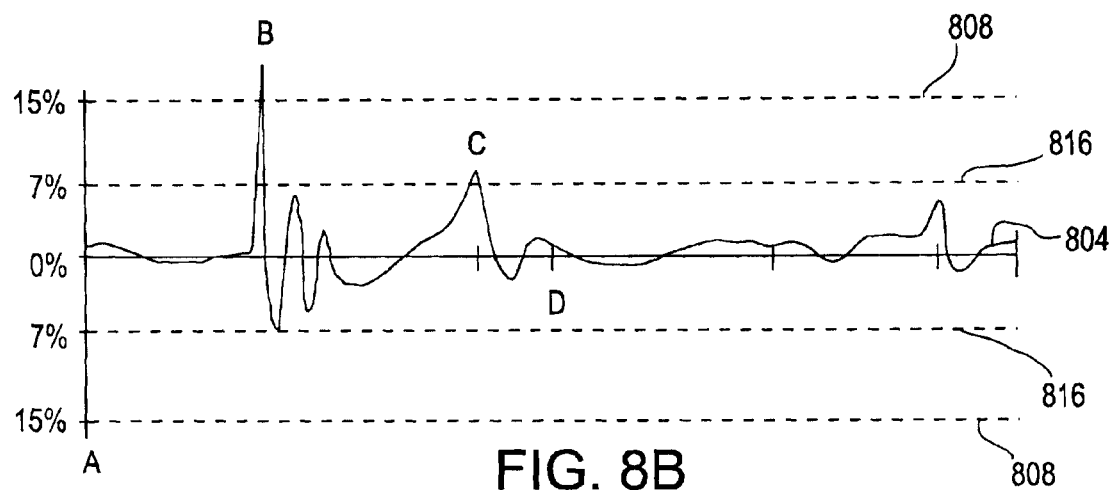
FIG. 8B is a time line showing an example position error of a transducer head with respect to a data track centerline.

With reference now to FIGS. 8A and 8B, aspects of the method illustrated in FIG. 7 are shown. FIG. 8A illustrates a time line showing times during which the hair trigger timer is operational, according to an example. The trace 804 in FIG. 8B illustrates the position of the centerline 332 of the write head 304 with respect to the centerline 404 of a target data track in terms of the percent of total track width by which the write head 304 is off center at times corresponding to the times illustrated in FIG. 8A. The scale at the left in FIG. 8B expresses the distance of the write head 304 from the centerline 404 as a percentage of the total track width of the target track 136.

In FIG. 8B, a large off-track event can be seen to occur at point B. Because the off-track event at time B is of sufficient magnitude to exceed the normal write fault threshold 808 then active, the hair trigger timer is activated at that time. The activation of the hair trigger timer is shown in FIG. 8A as an arrow 812. As shown in FIG. 8B, the normal write fault threshold 808 may be a distance from the centerline 404 of the target track 136 equal to 15 percent of the total width of the target track 136. After the hair trigger timer has been set, the hair trigger threshold will remain in effect until the timer expires. For example, following the off-track event shown at point B in FIG. 8B, the hair trigger threshold 816 is in effect until the hair trigger timer 812 expires at time D. At time C it can be seen from the trace 804 in FIG. 8B that the write head 304 has deviated from the centerline 404 a distance greater than 7 percent of the total width D of the target track 136. That is, the write head 304 has crossed the hair trigger write fault threshold 816. Although the off-track event occurring at time C is of a magnitude less than the magnitude normally required to trigger a write fault, according to the present example, the hair trigger timer is still in operation at time C. Therefore, the hair trigger write fault threshold 816 is in effect. Accordingly, the off-track event at time C causes the hair trigger timer, represented in FIG. 8A by an arrow 820, to be reset. Accordingly, due to the operation of the hair trigger timer 820, the hair trigger write fault threshold 816 remains in effect until time E. Note that, if the hair trigger timer were not implemented, the off-track event at time C would not reset the hair trigger timer.

According to one embodiment of the present invention, operation of the hair trigger timer, in addition to putting into effect the hair trigger threshold, may also disable write operations. Write operations may be disabled for as long as the hair trigger timer is in effect, or for a period determined by a separate shock timer.

Figure 9:
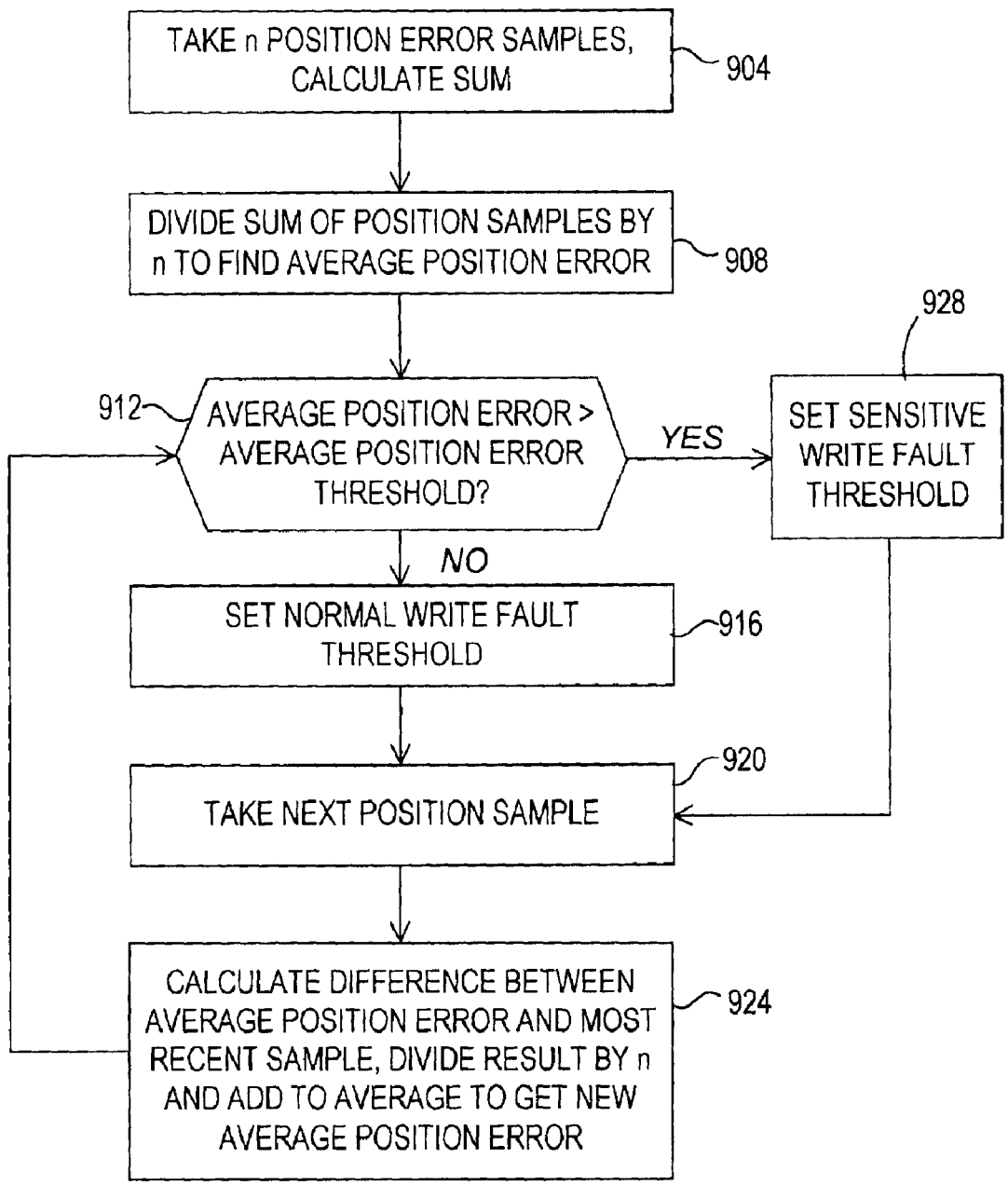
FIG. 9 is a functional flow diagram of the operation of a system according to yet another embodiment of the present invention.

With reference now to FIG. 9, yet another method for detecting track misregistration errors is illustrated. According to this embodiment of the present invention, N position samples are taken (step 904). For example, the system may determine the position of the write head 304 with respect to the centerline 404 of the data track 136 as the transducer head 126 crosses a sector 208. This may be done for N sectors. The values thus obtained, known as the position error, may be added together to obtain a sum (step 904). The sum is then divided by N to arrive at an average position error (step 908). Next, at step 912, the average position error is compared to an average error threshold, which functions as a write fault threshold. Therefore, it can be understood that the term "write fault" may include both past and present position errors. If the calculated average position error is less than the write fault threshold for the accumulated position error, the normal write fault threshold is set (step 916). Then, the next position sample is taken (step 920). At step 924, the difference between the average position error and the most recent position error sample is calculated. The result is divided by N and added to the average position error to obtain a new average position error. The new average position error is then compared to the average position error threshold at step 912. The steps 912, 916, 920 and 924 are repeated so long as the average position error threshold is not exceeded.

If at step 912 it is determined that the average position error is greater than the average position error threshold, the write fault threshold is reset to the sensitive write fault threshold (step 928). The next position sample is then taken (step 920) and a new average position error calculated (step 924). The system then returns to step 912. Accordingly, the reduced write fault threshold set at step 924 remains in effect until the average position error drops below the average position error threshold.

Figure 10A:
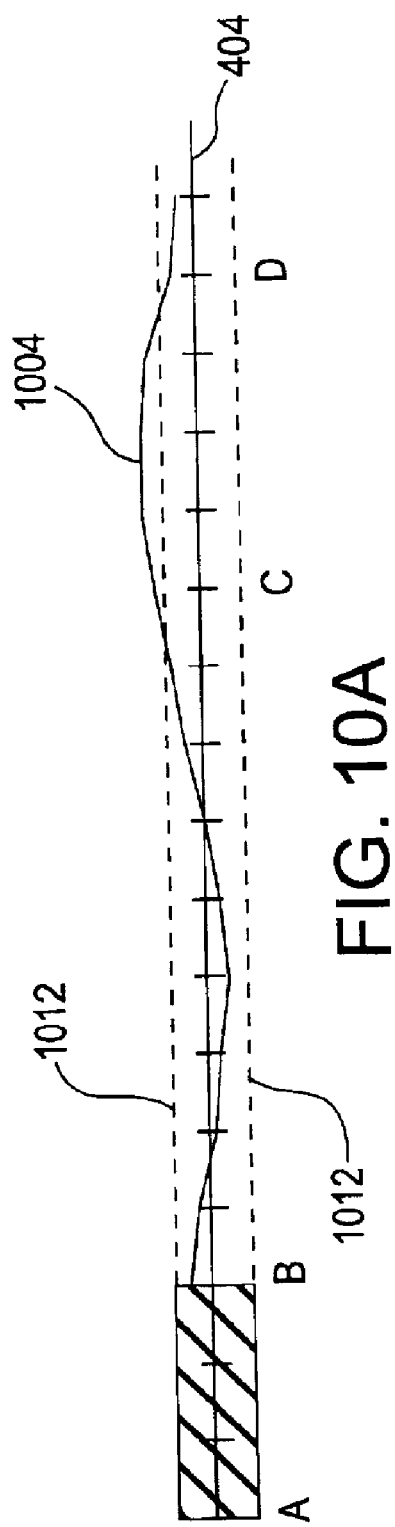
FIG. 10A is a time line of the operation of a system according to an embodiment of the present invention illustrated in FIG. 9.
Figure 10B:
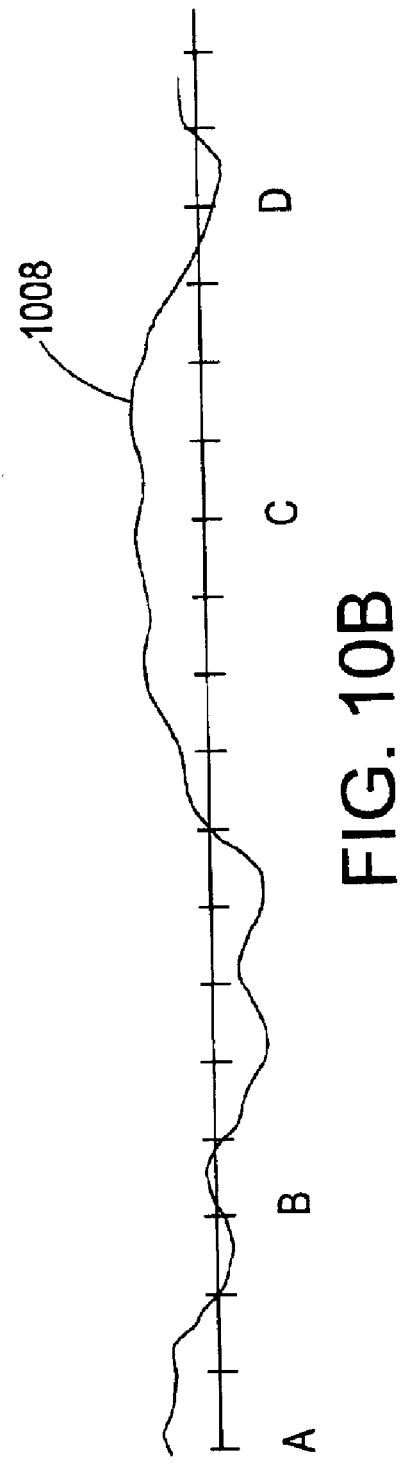
FIG. 10B is a time line illustrating an example position error of a transducer head with respect to the centerline of a data track.

With reference now to FIGS. 10A and 10B, aspects of the operation of the embodiment illustrated in FIG. 9 are shown. In particular, FIG. 10A illustrates a time line showing the accumulated average position error 1004. The trace 1008 in FIG. 10B illustrates the position of the transducer head 126 over time that results in the average position error 1004 illustrated in FIG. 10A. Between points A and B the average position error is unknown, because the requisite number of samples have not yet been collected. At time C, the accumulated average position error 1004 can be seen to cross the average position error threshold 1012. Accordingly, at time C, the system modifies the transducer head position control parameters. The modification to the transducer head position control parameters may comprise the implementation of a lower write fault threshold. This is believed desirable because, as the transducer head 126 has been observed in a position to one side of the centerline 404 of the target track 136 for a period of time, it is more vulnerable to track misregistration errors due to off-track events such as may be caused by shocks. The modification to the transducer head position control parameters may also include inhibiting write operations for a period of time. This may prevent write fault errors that are imminent, although it generally will have a greater impact on the data throughput performance of the disk drive 100 than simply lowering the write fault threshold.

At time D, the average position error 1004 illustrated in FIG. 10A can be seen to have dropped below the average position error threshold. Therefore, at time D, the transducer bead position control parameters are returned to normal. In FIG. 10B, it can be observed that, by time D, the persistent off center position of the transducer head 126, which caused the average position error to exceed the threshold 1012, has ceased, bringing the average position error 1004 to within the threshold limits.

It will also be appreciated that the average position error 1004 is plotted as distinct segments. This is a direct result of the described method, in which position error samples are taken over each servo sector and a new average calculated for each servo sector. Accordingly, the function used to calculate the average in the described embodiment is not continuous, but is instead piecewise. Although the illustrated embodiment describes calculating the average as each servo sector is passed, this is not necessarily the case. For instance, the average may be computed periodically, such as after every fourth servo sector is traversed. In addition, the average may be determined from a continuously collected position error. Of course, in implementing this embodiment of the present invention, the accumulated error need not be converted to an average value. For instance, a gross accumulated error may be compared to an appropriate threshold in determining whether activation of the reduced write fault threshold shock timer is warranted.

According to the present invention, a dynamic off track detector is disclosed for improving the performance of computer disk drives. In particular, the present invention provides a method for adapting disk drive transducer control parameters to observed environmental conditions. This allows the disk drive to better protect against write fault events that result in data errors, while maintaining a high data throughput. In addition, the present invention provides a method and apparatus for adapting the transducer head control parameters of a disk drive to the environment. Accordingly, the present invention allows the presence of observed off-track events to modify the transducer head control parameters, such that a write fault may more easily be triggered. Again, this allows the disk drive to better guard against write fault errors resulting in data loss, while maintaining a high rate of data throughput. In addition, the present invention provides a method and apparatus for monitoring the accumulated average position error of a transducer head. Where the accumulated average error is greater than a threshold value, transducer head control parameters may be modified. In this way, data loss due to a persistent off center position, which places the transducer head in a position that is more vulnerable to data loss due to off-track events, can be avoided. Again, this allows the disk drive to protect against data loss while maintaining a high rate of data throughput.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for reducing track misregistration errors in a disk drive, comprising:
   specifying a write fault of at least a first magnitude;
   in response to detecting a write fault of at least said first magnitude, preventing a write operation from occurring for at least a first time period using a first timer, wherein said first time period is a time equal to an amount of time required for at least two disk hard sectors to pass beneath said transducer head;
   specifying a write fault of at least a second magnitude, wherein said second magnitude is greater than said first magnitude;
   in response to detecting a write fault of at least said second magnitude, preventing a write operation from occurring for a least a second time period using a second timer that is different from said first timer, wherein said second time period is greater than said first time period.

2. The method of claim 1, wherein operation of the first timer and operation of the second timer overlap.

3. A method for reducing track misregistration errors in a disk drive, comprising:
   specifying a write fault of at least a first magnitude;
   in response to detecting a write fault of at least said first magnitude, preventing a write operation from occurring for at least a first time period using a first timer, wherein said first time period is about 130 μs;

specifying a write fault of at least a second magnitude, wherein said second magnitude is greater than said first magnitude;

in response to detecting a write fault of at least said second magnitude, preventing a write operation from occurring for a least a second time period using a second timer that is different from said first timer, wherein said second time period is greater than said first time period.

4. The method of claim 3, wherein operation of the first timer and operation of the second timer overlap.

5. A method for reducing track misregistration errors in a disk drive, comprising:

specifying a write fault of at least a first magnitude;

in response to detecting a write fault of at least said first magnitude, preventing a write operation from occurring for at least a first time period using a first timer;

specifying a write fault of at least a second magnitude, wherein said second magnitude is greater than said first magnitude;

in response to detecting a write fault of at least said second magnitude, preventing a write operation from occurring for a least a second time period using a second timer that is different from said first timer, wherein said second time period is greater than said first time period and wherein said second time period is a time equivalent to an amount of time required for at least 120 disk hard sectors to pass beneath said transducer head.

6. The method of claim 5, wherein operation of the first timer and operation of the second timer overlap.

7. A method for reducing track misregistration errors in a disk drive, comprising:

specifying a write fault of at least a first magnitude;

in response to detecting a write fault of at least said first magnitude, preventing a write operation from occurring for at least a first time period using a first timer;

specifying a write fault of at least a second magnitude, wherein said second magnitude is greater than said first magnitude;

in response to detecting a write fault of at least said second magnitude, preventing a write operation from occurring for a least a second time period using a second timer that is different from said first timer, wherein said second time period is greater than said first time period and wherein said second time period is about 6 ms.

8. The method of claim 7, wherein operation of the first timer and operation of the second timer overlap.

9. A method for reducing track misregistration errors in a disk drive, comprising:

specifying a write fault of at least a first magnitude;

in response to detecting a write fault of at least said first magnitude, preventing a write operation from occurring for at least a first time period using a first timer;

specifying a write fault of at least a second magnitude, wherein said second magnitude is greater than about two times said first magnitude;

in response to detecting a write fault of at least said second magnitude, preventing a write operation from occurring for a least a second time period using a second timer that is different from said first timer, wherein said second time period is greater than said first time period.

10. The method of claim 9, wherein operation of the first timer and operation of the second timer overlap.

11. A method for reducing track misregistration errors in a disk drive, comprising:

specifying a write fault of at least a first magnitude;

in response to detecting a write fault of at least said first magnitude, preventing a write operation from occurring for at least a first time period using a first timer;

specifying a write fault of at least a second magnitude, wherein said second magnitude is greater than said first magnitude;

in response to detecting a write fault of at least said second magnitude, preventing a write operation from occurring for a least a second time period using a second timer that is different from said first timer, wherein said second time period is greater than said first time period, wherein said write faults are measured as a distance of a transducer head from a centerline of a data track, and wherein said second magnitude comprises a write fault of about 35% of a data track width.

12. The method of claim 11, wherein said first magnitude comprises a write fault of greater than about 15% of a data track width.

13. The method of claim 11, wherein operation of the first timer and operation of the second timer overlap.

14. A method for reducing track misregistration errors in a disk drive, comprising:

specifying a write fault of at least a first magnitude;

in response to detecting a write fault of at least said first magnitude, preventing a write operation from occurring for at least a first time period using a first timer;

specifying a write fault of at least a second magnitude, wherein said second magnitude is greater than said first magnitude;

in response to detecting a write fault of at least said second magnitude, preventing a write operation from occurring for a least a second time period using a second timer that is different from said first timer, wherein said second time period is greater than said first time period and wherein said second time period is equivalent to a time required for a disk in said disk drive make at least ¼ of a revolution but less than a full revolution.

15. The method of claim 14, wherein operation of the first timer and operation of the second timer overlap.

16. A method for reducing track misregistration errors in a disk drive, comprising:

specifying a write fault of at least a first magnitude;

in response to detecting a write fault of at least said first magnitude, preventing a write operation from occurring for at least a first time period using a first timer;

specifying a write fault of at least a second magnitude, wherein said second magnitude is greater than said first magnitude;

in response to detecting a write fault of at least said second magnitude, preventing a write operation from occurring for a least a second time period using a second timer that is different from said first timer, wherein said second time period is greater than said first time period and wherein said second time period is equivalent to a time required for a disk in said disk drive to make at least ½ revolution but not more than ¾ of a revolution.

17. The method of claim 16, wherein operation of the first timer and operation of the second timer overlap.

18. A method for reducing track misregistration errors in a disk drive, comprising:

specifying a write fault of at least a first magnitude;

in response to detecting a write fault of at least said first magnitude, preventing a write operation from occurring for at least a first time period using a first timer;

specifying a write fault of at least a second magnitude, wherein said second magnitude is greater than said first magnitude;

in response to detecting a write fault of at least said second magnitude, preventing a write operation from occurring for a least a second time period using a second timer that is different from said first timer, wherein said second time period is greater than said first time period and wherein said second the period is equivalent to a time required for a disk in said disk drive to make about ¾ of a revolution.

19. The method of claim 18, wherein operation of the first timer and operation of the second timer overlap.

20. A hard disk drive comprising:

a base;

a disk comprising a plurality of data tracks arranged concentrically about said spindle, wherein each of said data tracks is segmented into a plurality of data sectors by servo sectors, and wherein said disks may be rotated at a constant velocity with respect to said base;

a transducer head having a read head for reading information from said data tracks and a write head for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a controller, interconnected to said voice coil motor, for controlling a position of said transducer head with respect to said data tracks, wherein said controller receives information concerning a position of said transducer head with respect to a centerline of a track being followed by said transducer head from said read head, wherein following a deviation of said transducer head from said centerline by a first distance, said write head is prevented from writing information to said data track for a first time period using a first timer, wherein said first time period is a time equal to an amount of time required for at least two servo sectors to pass beneath said transducer head, wherein following a deviation of said transducer head from said centerline by a second distance, greater than said first distance, said write head is prevented from writing information to said data track for a second time period, greater than said first time period, using a second timer that is different from said first timer.

21. The hard disk drive of claim 20, wherein operation of the first timer and operation of the second timer overlap.

22. A hard disk drive comprising:

a base;

a disk comprising a plurality of data tracks arranged concentrically about said spindle, wherein each of said data tracks is segmented into a plurality of data sectors by servo sectors, and wherein said disks may be rotated at a constant velocity with respect to said base;

a transducer head having a read head for reading information from said data tracks and a write head for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a controller, interconnected to said voice coil motor, for controlling a position of said transducer head with respect to said data tracks, wherein said controller receives information concerning a position of said transducer head with respect to a centerline of a track being followed by said transducer head from said read head, wherein following a deviation of said transducer head from said centerline by a first distance, said write head is prevented from writing information to said data track for a first time period using a first timer, wherein said first time period is about 130 µs, wherein following a deviation of said transducer head from said centerline by a second distance, greater than said first distance, said write head is prevented from writing information to said data track for a second time period, greater than said first time period, using a second timer that is different from said first timer.

23. The hard disk drive of claim 22, wherein operation of the first timer and operation of the second timer overlap.

24. A hard disk drive comprising:

a base;

a disk comprising a plurality of data tracks arranged concentrically about said spindle, wherein each of said data tracks is segmented into a plurality of data sectors by servo sectors, and wherein said disks may be rotated at a constant velocity with respect to said base;

a transducer head having a read head for reading information from said data tracks and a write head for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a controller, interconnected to said voice coil motor, for controlling a position of said transducer head with respect to said data tracks, wherein said controller receives information concerning a position of said transducer head with respect to a centerline of a track being followed by said transducer head from said read head, wherein following a deviation of said transducer head from said centerline by a first distance, said write head is prevented from writing information to said data track for a first time period using a first timer, wherein following a deviation of said transducer head from said centerline by a second distance, greater than said first distance, said write head is prevented from writing information to said data track for a second time period, greater than said first time period, using a second timer that is different from said first timer, wherein said second time period is a time equivalent to an amount of time required for at least 120 servo sectors to pass beneath said transducer head.

25. The hard disk drive of claim 24, wherein operation of the first timer and operation of the second timer overlap.

26. A hard disk drive comprising:

a base;

a disk comprising a plurality of data tracks arranged concentrically about said spindle, wherein each of said data tracks is segmented into a plurality of data sectors by servo sectors, and wherein said disks may be rotated at a constant velocity with respect to said base;

a transducer head having a read head for reading information from said data tracks and a write head for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a controller, interconnected to said voice coil motor, for controlling a position of said transducer head with respect to said data tracks, wherein said controller receives information concerning a position of said transducer head with respect to a centerline of a track being followed by said transducer head from said read head, wherein following a deviation of said transducer head from said centerline by a first distance, said write head is prevented from writing information to said data track for a first time period using a first timer, wherein following a deviation of said transducer head from said centerline by a second distance, greater than said first distance, said write head is prevented from writing information to said data track for a second time period, greater than said first time period, using a second timer that is different from said first timer, wherein said second time period is about 6 ms.

27. The hard disk drive of claim 26, wherein operation of the first timer and operation of the second timer overlap.

28. A hard disk drive comprising:

a base;

a disk comprising a plurality of data tracks arranged concentrically about said spindle, wherein each of said data tracks is segmented into a plurality of data sectors by servo sectors, and wherein said disks may be rotated at a constant velocity with respect to said base;

a transducer head having a read head for reading information from said data tracks and a write head for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a controller, interconnected to said voice coil motor, for controlling a position of said transducer head with respect to said data tracks, wherein said controller receives information concerning a position of said transducer head with respect to a centerline of a track being followed by said transducer head from said read head, wherein following a deviation of said transducer head from said centerline by a first distance, said write head is prevented from writing information to said data track for a first time period using a first timer, wherein following a deviation of said transducer head from said centerline by a second distance, greater than said first distance, said write head is prevented from writing information to said data track for a second time period, greater than said first time period, using a second timer that is different from said first timer, wherein said second distance is greater than about two times said first distance.

29. The hard disk drive of claim 28, wherein operation of the first timer and operation of the second timer overlap.

30. A hard disk drive comprising:

a base;

a disk comprising a plurality of data tracks arranged concentrically about said spindle, wherein each of said data tracks is segmented into a plurality of data sectors by servo sectors, and wherein said disks may be rotated at a constant velocity with respect to said base;

a transducer head having a read head for reading information from said data tracks and a write head for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a controller, interconnected to said voice coil motor, for controlling a position of said transducer head with respect to said data tracks, wherein said controller receives information concerning a position of said transducer head with respect to a centerline of a track being followed by said transducer head from said read head, wherein following a deviation of said transducer head from said centerline by a first distance, said write head is prevented from writing information to said data track for a first time period using a first timer, wherein following a deviation of said transducer head from said centerline by a second distance, greater than said first distance, said write head is prevented from writing information to said data track for a second time period, greater than said first time period, using a second timer different from said first timer, wherein said second distance comprises a write fault of about 35% of a data track width.

31. The hard disk drive of claim 30, wherein said first distance comprises a write fault of greater than about 15% of a data track width.

32. The hard disk drive of claim 30, wherein operation of the first timer and operation of the second timer overlap.

33. A hard disk drive comprising:

a base;

a disk comprising a plurality of data tracks arranged concentrically about said spindle, wherein each of said data tracks is segmented into a plurality of data sectors by servo sectors, and wherein said disks may be rotated at a constant velocity with respect to said base;

a transducer head having a read head for reading information from said data tracks and a write head for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a controller, interconnected to said voice coil motor, for controlling a position of said transducer head with respect to said data tracks, wherein said controller receives information concerning a position of said transducer head with respect to a centerline of a track being followed by said transducer head from said read head, wherein following a deviation of said transducer head from said centerline by a first distance, said write head is prevented from writing information to said data track for a first time period using a first timer, wherein following a deviation of said transducer head from said centerline by a second distance, greater than said first distance, said write head is prevented from writing information to said data track for a second time period, greater than said first time period, using a second timer that is different from said first timer, wherein said second time period is equivalent to a time required for said disk to make at least ¼ of a revolution but less than a full revolution.

34. The hard disk drive of claim 33, wherein operation of the first timer and operation of the second timer overlap.

35. A hard disk drive comprising:

a base;

a disk comprising a plurality of data tracks arranged concentrically about said spindle, wherein each of said data tracks is segmented into a plurality of data sectors by servo sectors, and wherein said disks may be rotated at a constant velocity with respect to said base;

a transducer head having a read head for reading information from said data tracks and a write head for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a controller, interconnected to said voice coil motor, for controlling a position of said transducer head with respect to said data tracks, wherein said controller receives information concerning a position of said transducer head with respect to a centerline of a track being followed by said transducer head from said read head, wherein following a deviation of said transducer head from said centerline by a first distance, said write head is prevented from writing information to said data track for a first time period using a first timer, wherein following a deviation of said transducer head from said centerline by a second distance, greater than said first distance, said write head is prevented from writing information to said data track for a second time period, greater than said first time period, using a second timer that is different from said first timer, wherein said second time period is equivalent to a time required for said disk to make at least ½ a revolution but not more than ¾ of a revolution.

36. The hard disk drive of claim 35, wherein operation of the first timer and operation of the second timer overlap.

37. A hard disk drive comprising:

a base;

a disk comprising a plurality of data tracks arranged concentrically about said spindle, wherein each of said data tracks is segmented into a plurality of data sectors by servo sectors, and wherein said disks may be rotated at a constant velocity with respect to said base;

a transducer head having a read head for reading information from said data tracks and a write head for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a controller, interconnected to said voice coil motor, for controlling a position of said transducer head with respect to said data tracks, wherein said controller receives information concerning a position of said transducer head with respect to a centerline of a track being followed by said transducer head from said read head, wherein following a deviation of said transducer head from said centerline by a first distance, said write head is prevented from writing information to said data track for a first time period using a first timer, wherein following a deviation of said transducer head from said centerline by a second distance, greater than said first distance, said write head is prevented from writing information to said data track for a second time period, greater than said first time period, using a second timer that is different from said first timer, wherein said second time period is equivalent to a time required for said disk to make about ¾ of a revolution.

38. The hard disk drive of claim 37, wherein operation of the first timer and operation of the second timer overlap.

39. A method for reducing track misregistration errors in a disk drive, comprising:

detecting an off-track event, wherein a transducer head of said disk drive is outside of an off-track threshold;

comparing a magnitude of said detected off-track event to a severe shock threshold;

prohibiting write operations for an extended period of time, using a first timer, if said detected off-track event exceeds said severe shock threshold; and, prohibiting write operations for a shortened period of time, using a second timer different from said first timer, if said detected off-track event does not exceed said severe shock threshold, wherein said shortened period of time is equivalent to an amount of required for at least 2 data track sectors to pass beneath said transducer head.

40. The method of claim 39, wherein operation of the first timer and operation of the second timer overlap.

41. A method for reducing track misregistration errors in a disk drive, comprising:

detecting an off-track event, wherein a transducer head of said disk drive is outside of an off-track threshold;

comparing a magnitude of said detected off-track event to a severe shock threshold;

prohibiting write operations for an extended period of time, using a first timer, if said detected off-track event exceeds said severe shock threshold; and, prohibiting write operations for a shortened period of time, using a second timer different from said first timer, if said detected off-track event does not exceed said severe shock threshold, wherein said shortened period of time is about 130 ms.

42. The method of claim 41, wherein an off-track event comprises a deviation of said transducer head from a centerline of a data track by a distance equivalent to about 15% of a width of said data track.

43. The method of claim 41, wherein operation of the first timer and operation of the second timer overlap.

* * * * *